United States Patent
Bocherens

Patent Number: 5,841,066
Date of Patent: Nov. 24, 1998

[54] LIGHTENING STRIP

[76] Inventor: Eric Bocherens, Résidence "Les Cyclades" Bât. 1 1047, Avenue de la Résistance, 83000 Toulon, France

[21] Appl. No.: 800,338

[22] Filed: Feb. 14, 1997

[30] Foreign Application Priority Data

Feb. 15, 1996 [FR] France ................................. 96 01845

[51] Int. Cl.$^6$ .................................................. H05F 3/00
[52] U.S. Cl. .............................................. 174/2; 361/218
[58] Field of Search ........................ 174/1, 2, 3, 4 R, 174/4 C, 5 R, 5 SB, 5 SG; 191/22 R; 361/218

[56] References Cited

U.S. PATENT DOCUMENTS

| | | | |
|---|---|---|---|
| 2,982,494 | 5/1961 | Amason | 361/218 |
| 4,445,161 | 4/1984 | Brick | 361/218 |
| 4,604,303 | 8/1986 | Takakura et al. | 427/229 |
| 5,614,312 | 3/1997 | Tucker et al. | 428/323 |

FOREIGN PATENT DOCUMENTS

| | | | |
|---|---|---|---|
| 2400245 | 3/1979 | France | 361/218 |
| WO83/01172 | 3/1983 | WIPO | 361/218 |

*Primary Examiner*—Bot L. Ledynh
*Assistant Examiner*—Joseph Waks
*Attorney, Agent, or Firm*—Oliff & Berridge, PLC

[57] ABSTRACT

A lightning strip particularly for protection of aircraft radomes has an attaching face adapted to be attached to the surface to be protected from lightning and an exposed face. The strip is made of a thermoplastic polymer filled with conducting particles. It has a terminal designed to ensure grounding that is shaped by heating and molding to match the shape of the head of a screw. The greatest height of the strip is greater than the thickness of a layer of water or ice that could cover the surface to be protected in wet weather conditions, namely approximately 2.5 mm or more.

5 Claims, 1 Drawing Sheet

LIGHTENING STRIP

BACKGROUND OF THE INVENTION

1. Field of the Invention

The present invention relates to a lightning diversion strip, particularly for protection of aircraft radomes.

2. Description of the Related Art

It is known that when an aircraft passes through a storm it can be struck by lightning. These lightning strikes tend to occur at the ends of the aircraft where radomes are located. Lightning may cause substantial damage to the radome because it is an envelope that is transparent to electromagnetic waves and that protects extremely expensive electronic equipment such as radar and countermeasures.

To protect the radome or other parts of the aircraft, it is known that lightning diversion strips may be placed on the outer surface to be protected. These strips must be placed at likely lightning strike points to ensure that strong discharge currents (which can be as high as 200 kA) will pass from the strike point to the aircraft ground. These lightning diversion strips must also be transparent to electromagnetic waves. In other words, they must cause minimum interference with wave transmission though the radome wall.

Various types of lightning diversion strips have been used. For example, solid metal strips are known, the principle of which is to carry the energy from a bolt of lightning by conducting current through the thickness of the strip. However, these strips have many drawbacks. When the lightning impact is severe, the released energy can vaporize part of the metal and then perforate the radome. Moreover, due to their high reflection factor, these strips substantially interfere with the transmission of electromagnetic waves through the radome wall.

GB Patent No. 2,132,027 describes a metal strip with a thickness of approximately 0.25 mm and having rectangular holes to decrease the amount of vaporizable metal and, thus, cut down on potential damage. However, while these strips somewhat remedy the first drawback, they are unsatisfactory in terms of interference-free transmission of electromagnetic waves.

U.S. Pat. No. 4,237,514 describes a very fine polyester lightning diversion strip. On the exposed face of this strip, metal particles (generally aluminum) are applied with a flexible epoxy. This strip has a very high internal resistance, but can conduct the lightning bolt along its outer face to the aircraft ground. This strip has the advantage of being inexpensive and easy to install; however it has substantial disadvantages. It can vaporize with the first lightning strike, and thus provide only one use. This type of strip is also sensitive to erosion and can create electrostatic interference that generates distortions in the radiation diagram of the radar antenna inside the radome.

U.S. Pat. No. 4,796,153 describes another lightning diversion strip which, because of its greater efficiency, is used when maximum protection for very expensive radar is desired. This strip is made of a fine dielectric (glass-epoxy) backing. Conducting metal segments are attached, aligned, and spaced on the exposed face of this backing. The current from a lightning bolt is made to jump from segment to segment by local ionization of the air above the segments.

However, this type of strip has numerous drawbacks. The first relates to its reliability: on almost every first strike, erosion occurs at the surface of the segments and causes them to drop off. When a large number of adjacent segments have detached from the backing, the strip no longer functions. Moreover, the glass-epoxy backing of these segmented strips is more sensitive to erosion due to rainwater. Thus, the backing must be protected with a layer of anti-erosion paint. However, the conducting segments must not be painted, otherwise the strip becomes inoperative. Thus, these strips are troublesome and expensive to make and maintain.

The second drawback relates to the connection of the foot or end of the strip to the aircraft ground. When these strips have no terminals, connection to the aircraft ground is effected by a metal part called a ground strap. This ground strap has holes for attachment to the aircraft ground, and its tip is screwed onto an insert in the radome so the end of the strap covers the foot of the lightning diversion strip. This simple covering is ineffective because of the poor electrical continuity obtained between the strap and the strip.

To overcome this drawback, these strips generally have round terminals made of a flat metal washer mounted on the glass-epoxy backing and drilled out to the diameter of the screw which joins it sandwich-style to the radome. To adapt it to the shape of the screw head, a recess is then made by stamping. However, this stamping almost routinely causes the terminal to crack. And even if the terminal stays flat, the head of the screw, by deforming the terminal, also unacceptably deforms the foot of the strip.

Moreover, this type of strip is ineffective in approximately 30% of cases under wet weather conditions (rain, ice, etc.). When subjected to trickling water and ice, radomes have been observed to perforate due to lightning. Hence these strips are unreliable under wet flight conditions.

SUMMARY OF THE INVENTION

The present invention provides a lightning strip that is sufficiently transparent to electromagnetic waves, inexpensive, erosion-resistant, reuseable, and has adaptable conductivity. The lightning strip is particularly designed for protection of aircraft radomes and has an attaching face adapted to be attached to the surface of a radome to be protected from lightning and an exposed face. The lightning strip is comprised of a thermoplastic polymer filled with conducting particles. The strip can be easily attached to ensure good grounding. The lightning strip may have a terminal designed to ensure grounding that is shaped by heating and molding to the head of a screw that holds the terminal sandwich-fashion to the radome. The thermoplastic polymer of the lightning strip has good shaping ability and is particularly suited for making a grounding terminal.

The strip, where permitted by aerodynamic factors, effectively protects against lightning strikes under wet weather conditions (i.e., rain, ice, etc.).

For this purpose, the strip is higher than a layer of water or ice that might cover the surface of the radome to be protected under wet weather conditions. Thus, the lightning strip provides a preferred lightning strike point even under severe weather conditions.

BRIEF DESCRIPTION OF THE DRAWINGS

Other advantages will appear from reading the description below relating to a nonlimiting embodiment of a lightning strip according the invention as well as the attached drawing, wherein.

DETAILED DESCRIPTION OF PREFERRED EMBODIMENTS

Figure 1:
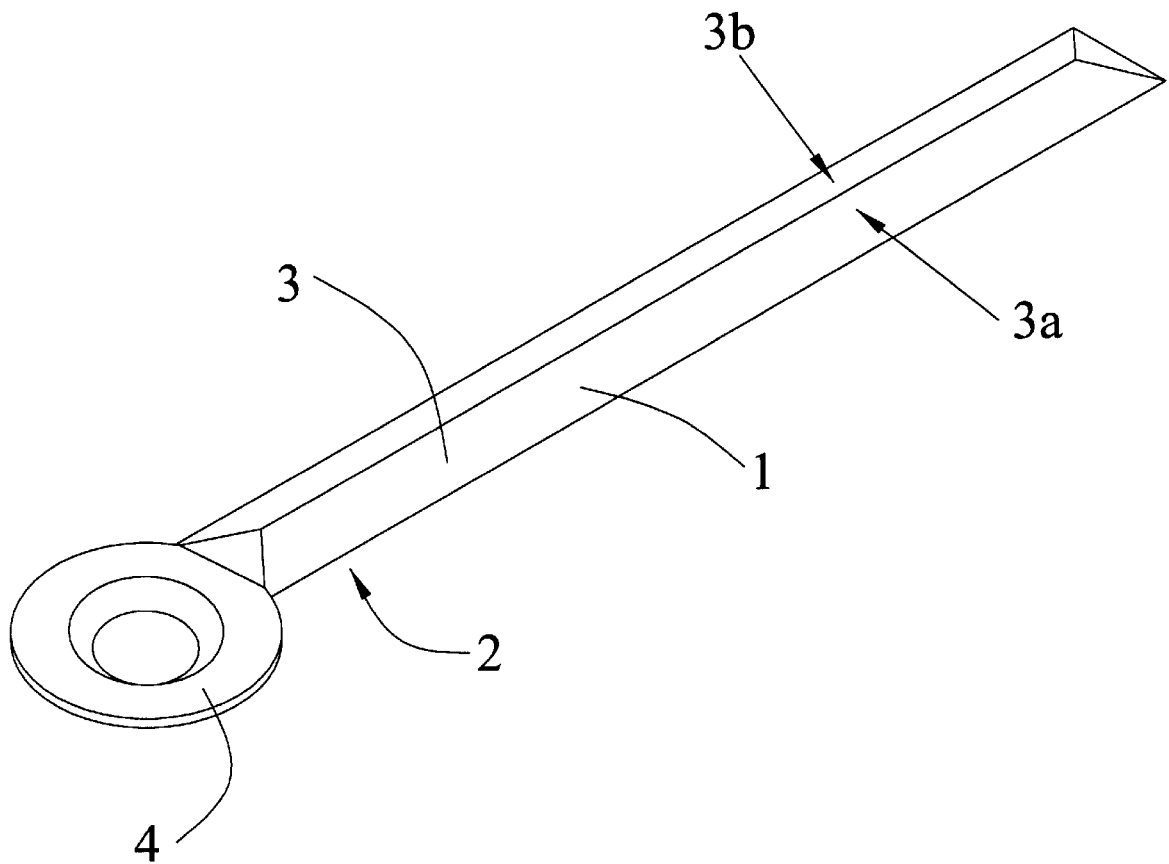
FIG. 1 is a perspective view of a lightning strip of the present invention.

Lightning strip 1 has a rectangular lower face 2 designed to be attached, by gluing or any other known means, to the surface of a radome (not shown) to be protected against lightning strikes. This strip also has an outer face 3 that is composed of two planes 3a and 3b that form a dihedron, so that the strip cross section is pseudo-triangular. The dihedral angle is preferably 90 degrees. Strip 1 also has a rounded terminal 4 adapted to the head and drilled out to the diameter of a screw that holds it sandwich-fashion to the radome. This terminal can easily be shaped to adapt to different types of screws for different types of radomes.

The lightning strip is made of a thermoplastic polymer containing conductive particles. The thermoplastic polymer is preferably polyether ether ketone (PEEK), a thermoplastic that is used in aeronautics because of its good erosion resistance. However, the thermoplastic can be another polymer such as PPS (polyphenylsulfide), PPO (polyphenylene oxide) or a mixture of these polymers.

The thermoplastic strip 1 contains conductive carbon particles made of different grades of carbon black depending on the desired resistivity. Preferably, the contact surface of the carbon black is between 600 and 1300 $m^2/g$, for concentrations of 2 to 5% for example. These particles can also be metal, ferrites or conductive polymer particles such as polyaniline, polypyrrol, etc. The conductive particles can also be a mixture of these particles. The choice of conductive particles and their concentrations is made according to electromagnetic transparency requirements and the conductivity required for the particular application.

When permitted by aerodynamic constraints, strip 1 has a maximum thickness greater than a layer of water or ice that covers the part of the aircraft on which the lightning strip is disposed. The edge of the pseudo-triangular shape of the strip protrudes from a layer of water and ice so that the strip always has a lightning strike point available under wet conditions. This thickness is approximately 2.5 mm or more. The thickness varies and is determined as a function of the geometries of the lightning strip and the surface to which it is attached. Tests on civil aircraft have shown that water thicknesses are generally less than 2.5 mm.

Because the strip is made of a thermoplastic polymer, it is easy to manufacture. The thermoplastic is made conductive by providing a conducting additive. The operation that incorporates enough carbon (conducting particles) in proportion to polymer to give the maximum conductivity is called "compounding." This produces a master mixture in the form of granules. It is then possible to incorporate into it pure polymer granules to reduce the conductivity of the mixture. This operation allows the conductivity of the lightning strip to be adapted to its total length by diluting the master mixture. Preferably, the conductivity increases with the strip length.

An advantage of the lightning strip is that it is highly resistant to erosion by rain or sand. Its composition also resists chemical attack from oils or hydrocarbons, etc.

The lightning strip is also inexpensive to make, is easily mounted on the structures to be protected, and has flexibility to conform to the support to which it adheres without sustaining damage. Thus, it can be made self-adhesive. It is easy to replace and its maintenance is easier than that of the existing strips.

The thermoplastic nature of the polymer makes it easy to shape. It can be made by extrusion, or any other means. For extrusion, the master mixture is heated to a temperature below its melting point and is pushed by an endless screw through a die that gives it the required cross-sectional shape.

Shaping the grounding terminal is also easy. It can be done with a heated clamp that engages one end of the strip between two jaws, one of which is the shape of the head of the screw that will attach it. Strip 1 preferably is 10 mm wide while its length is adjusted according to the application, for example, between 0.3 and 2 m.

The lightning strip of the present invention allows large strip lengths to be obtained. Thus, it is possible to stock terminal-less strips and to make terminals adapted to a particular radome by heating and casting on demand. This transformation is made possible by the nature of the thermoplastic material, which is not possible with other polymers such as elastomers for example. It is no longer necessary to maintain inventories of difficult to produce strips having different stamped terminals. This strip can be shaped without any of the problems previously encountered.

The lightning strip 1 can be disposed on any part of an aircraft where protection against lightning strikes is required.

The cross section of strip 1 can also be trapezoidal with the largest glued face being rectangular or circular.

While the present invention has been described with the specific embodiments outlined above, many alternatives, modifications and variations are apparent to those skilled in the art. Accordingly, the preferred embodiments described above are illustrative and not limiting. Various changes may be made without departing from the spirit and scope of the invention as defined in the following claims.

What is claimed is:

1. A lightning strip comprising:
   an attaching face adapted to be attached to a surface; and
   an exposed face, wherein the lightning strip is comprised of a thermoplastic polymer mixed with conductive particles, wherein the height of the strip is greater than a layer of water or ice that might cover the surface to be protected under wet weather conditions.

2. The lightning strip of claim 1, wherein the height of the strip is approximately 2.5 mm or more.

3. The lightning strip of claim 1, wherein a cross-sectional shape of the lightning strip is substantially one of pseudo-triangular, trapezoidal and semicircular.

4. The lightning strip of claim 1, wherein the thermoplastic polymer is one of polyether ether ketone, polyphenylsulfide, polyphenylene oxide, and a mixture of at least two of polyether ether ketone, polyphenylsulfide and polyphenylene oxide.

5. The lightning strip of claim 1, wherein the conductive particles are one of carbon black particles, metal particles, conductive polymer particles, and a mixture of at least two of carbon black particles, metal particles and polymer particles.

* * * * *